US009942163B2

United States Patent
Cui et al.

(10) Patent No.: US 9,942,163 B2
(45) Date of Patent: Apr. 10, 2018

(54) METHOD AND APPARATUS FOR MANAGING MEDIA ACCESS CONTROL ADDRESSES

(71) Applicant: Telefonaktiebolaget L M Ericsson (publ), Stockholm (SE)

(72) Inventors: Baifeng Cui, Beijing (CN); Jiang He, Beijing (CN); Ying Lu, Beijing (CN)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 95 days.

(21) Appl. No.: 14/652,148

(22) PCT Filed: Dec. 18, 2012

(86) PCT No.: PCT/CN2012/086828
§ 371 (c)(1),
(2) Date: Jun. 15, 2015

(87) PCT Pub. No.: WO2014/094229
PCT Pub. Date: Jun. 26, 2014

(65) Prior Publication Data
US 2015/0334038 A1    Nov. 19, 2015

(51) Int. Cl.
*H04L 12/741* (2013.01)
*H04L 12/865* (2013.01)
(Continued)

(52) U.S. Cl.
CPC ...... *H04L 47/6275* (2013.01); *H04L 12/4625* (2013.01); *H04L 45/66* (2013.01); *H04L 63/1466* (2013.01)

(58) Field of Classification Search
None
See application file for complete search history.

(56) References Cited

U.S. PATENT DOCUMENTS 6,320,870 B1 * 11/2001 Thaler .................. H04L 12/413
370/445
9,019,973 B1 * 4/2015 Shukla ..................... H04L 45/02
370/395.3
(Continued)

FOREIGN PATENT DOCUMENTS

CN    101431472 A    5/2009
CN    101510882 A    8/2009
(Continued)

OTHER PUBLICATIONS

IEEE, "IEEE Standard for Local and metropolitan area networks—Media Access Control (MAC) Bridges and Virtual Bridge Local Area Networks", IEEE Computer Society, IEEE Std 802.1Q™-2011 (Revision of IEEE Std 802.1Q-2005), New York, NY, USA, Aug. 31, 2011, 1-1365.
(Continued)

*Primary Examiner* — Ayaz Sheikh
*Assistant Examiner* — Tarell Hampton
(74) *Attorney, Agent, or Firm* — Murphy, Bilak & Homiller, PLLC

(57) ABSTRACT

A method and apparatus for managing a media access control address are provided. The method comprises assigning a priority to the MAC address. The method also comprises managing the MAC address in a forwarding database based on the priority. With the method and apparatus, a MAC flooding attack can be efficiently avoided and communication performance would be improved in a secure manner.

16 Claims, 4 Drawing Sheets

(51) Int. Cl.
*H04L 12/46* (2006.01)
*H04L 29/06* (2006.01)
*H04L 12/721* (2013.01)

(56) References Cited

U.S. PATENT DOCUMENTS

| | | | |
|---|---|---|---|
| 2003/0033423 A1* | 2/2003 | Okabe | H04L 29/12009 709/232 |
| 2003/0118035 A1* | 6/2003 | Sharma | H04L 45/00 370/401 |
| 2004/0177107 A1* | 9/2004 | Qing | H04L 12/5695 709/200 |
| 2004/0213286 A1* | 10/2004 | Jette | H04J 14/02 370/466 |
| 2005/0254503 A1* | 11/2005 | Claseman | H04L 12/4625 370/395.41 |
| 2009/0028154 A1* | 1/2009 | Jiang | H04L 45/02 370/392 |
| 2009/0154349 A1* | 6/2009 | Bernard | H04Q 11/0067 370/235 |
| 2009/0279549 A1* | 11/2009 | Ramanathan | G06F 8/65 370/395.4 |
| 2009/0296728 A1 | 12/2009 | Srinivasan | |
| 2010/0272046 A1 | 10/2010 | Guo | |
| 2014/0071825 A1* | 3/2014 | Chhabra | G06F 13/124 370/236 |

FOREIGN PATENT DOCUMENTS

| | | |
|---|---|---|
| CN | 101820435 A | 9/2010 |
| CN | 102356607 A | 2/2012 |
| WO | 9900941 A1 | 1/1999 |

OTHER PUBLICATIONS

IEEE, "IEEE Standard for Local and Metropolitan Area Networks: Media Access Control (MAC) Bridges", IEEE Computer Society, IEEE Std 802.1D™-2004 (Revision of IEEE Std 802.1D, 1998 Edition), Feb. 9, 2004, 1-306.

* cited by examiner

METHOD AND APPARATUS FOR MANAGING MEDIA ACCESS CONTROL ADDRESSES

TECHNICAL FIELD

Embodiments of the present invention generally relate to communication techniques. More particularly, embodiments of the present invention relate to a method and apparatus for managing a Media Access Control (MAC) address.

BACKGROUND

The following description of background art may include insights, discoveries, understandings or disclosures, or associations together with disclosures not known to the relevant art prior to the present invention but provided by the present invention. Some such contributions of the present invention may be specifically pointed out below, while other such contributions of the present invention will be apparent from their context.

In an Ethernet bridge, a Forwarding Database (FDB) is used to support queries by a forwarding process to determine whether a received Ethernet frame, with given values of a Destination MAC (DMAC) address and optionally a virtual local access network identifier (VLAN ID), is to be forwarded through or filtered out. Each entry in the FDB consists of a MAC address, an identifier of the port on which the MAC address was received, and optionally a VLAN ID. According to different attributes, the entries in the FDB can be divided into static and dynamic entries. The static entries can be manually configured by a management action, such as performed by network operators or administrators, and are never aging until being manually deleted from the FDB. In contrast, the dynamic entries are automatically entered into the FDB by an FDB learning process and would age out after a configurable life cycle. Upon invoking, the FDB learning process will create or update a forwarding entry that specifies a reception port for the source MAC (SMAC) address and the VLAN ID of a received frame. In particular, the SMAC address of each received frame is stored into the FDB so that future frames destined for that address can be forwarded only to a bridge interface on which that SMAC address has been learnt. For example, when an Ethernet frame arrives at the bridge, the bridge will inspect for the DMAC address in a frame header and look up the FDB for information about where to deliver the frame. If the lookup ends up in failure, i.e., the DMAC address is not found in the FDB, usually the frame will be flooded out of all ports in the same broadcast domain. In other words, frames destined for unrecognized addresses are forwarded out of all bridge interfaces except the one through which the frame is received. In this manner, traffic on the attached LANs can be minimized.

Although the FDB may be a highly workable scheme for forwarding Ethernet frames, it is vulnerable to network attacks from all kinds of illegal invader. One common form of the attack is a MAC flooding attack, which has been purposefully designed based on the fact that the size of the FDB is limited. In a typical MAC flooding attack, a large number of Ethernet frames are sent to the Ethernet bridge from a potential attacker and each Ethernet frame contains respective different SMAC address. Upon receipt at the Ethernet bridge, the limited FDB would be rapidly occupied or populated with a large number of SMAC addresses even if a very large size of FDB is supported. In this manner, the MAC flooding attack not only consumes the limited FDB, but also forces some other legal MAC addresses out of the FDB. As discussed above, if the MAC addresses are not found in the FDB when forwarding, the Ethernet frames related to these MAC addresses will be sent out in a broadcast way. This results in degradation of service quality and the leak of information to the attacker, who may capture the broadcast packets and analyze them to obtain sensitive or confidential data. For an easy understanding of the MAC flooding attack, discussion will be made with reference to FIG. 1.

FIG. 1 schematically illustrates a scenario in which a network attacker launches a MAC flooding attack against an Ethernet switch. As illustrated in FIG. 1, an attacker starts a MAC flooding attack from a host 2 with numerous Ethernet frames and upon the attack, an FDB residing in an Ethernet switch 1 will be immediately and fully occupied. When a host 1, acting as a normal or legal user, tries to communicate with a server 1, the MAC address of the host 1 (00: 03: 5a: 23: 01: 01), which has not yet been learnt, needs to be learnt through an FDB learning process. However, the MAC address of the host 1 cannot be inserted into the FDB because the FDB has been full and no room for such insertion. Due to this situation, all the traffic from the server 1 to the host 1 will be sent in a broadcast manner and the attacker at the host 2 can easily receive all the Ethernet frames from the server 1 to the host 1, which causes serious security issues and brings about great degradation of communication performance.

Although some standards or techniques, such as a port security technique, IEEE 802.1X, a static MAC address technique and a MAC Access Control List (ACL), have been proposed for protecting the Ethernet switch from being attacked by illegal invaders, they cannot provide a once-for-all approach and are more or less problematic. Take the port security technique for example, among other defects, it does not work well with the movement of a station across multiple ports when the secure MAC addresses is manually configured and may increase operational expense (OPEX). As for the IEEE 802.1X, it introduces Authentication, Authorization, and Accounting (AAA) servers so as to ensure only legal MAC addresses being learnt. However, cooperative working among the servers may weaken functionality of each server and thus provide limited capability of protecting the Ethernet switch from the MAC flooding attack. In addition, it may also bring out OPEX issues. As for the static MAC address technique, it may have the similar defects as the port security technique as mentioned above. Regarding the MAC ACL, it may prevent the Ethernet frames with fake or illegal MAC addresses from being forwarded. However, it cannot prevent the fake MAC addresses from being stored into the FDB.

In addition to the MAC flooding attack as discussed above, the Ethernet switch, when operated in a distributed manner, may also face a synchronization issue, as will be discussed below in connection with FIG. 2.

FIG. 2 schematically illustrates a distributed Ethernet switch with multiple line cards. As illustrated in FIG. 2, in the distributed Ethernet switch that comprises multiple line cards (such as line cards 1, 2, . . . , n) carrying respective ports and interconnected by a backplane, each line card may play roles as an ingress line card and an egress line card both and have its own FDB. When an ingress line card receives a frame, it performs SMAC learning (i.e., the FDB learning process) and DMAC lookup processing. For the SMAC learning, a new FDB entry may be inserted into the FDB or existing FDB entry may be refreshed. After that, the new FDB entry will be synchronized to all other line cards.

For example, a host 1 is running a Voice over Internet Protocol (VoIP) application through Virtual Router Redundancy Protocol (VRRP) routers, and a host 2 is downloading files from an FTP server. MAC addresses appeared on the line cards 1, 3 and n−1 should be distributed to other line cards so that the FDBs in all line cards are aligned or synchronized. Due to different time sensitive requirements, the VoIP application is more time-sensitive than the FTP application.

For the VoIP application, synchronization of the MAC address of the VRRP router among the line cards within mini-seconds is required. In view of this, when a VRRP router switchover occurs, the port change associated with the VRRP MAC address in the FDB should be synchronized to all the line cards promptly.

For the FTP application, synchronization of the gateway MAC address to the FTP server among the line cards within seconds is acceptable. Therefore, in case of the MAC movement, the change of the MAC address in the FDB being synchronized to all line cards within several seconds is expected.

Currently, several mechanisms are considered in the specific synchronization implementations. First, the synchronization is executed immediately after an SMAC address is learnt. However, this is not commonly used because it will consume too much system resources such as bandwidth and/or CPU resources. For example, for the system having software controlled FDB learning processing enabled and many line cards equipped, the capability of a CPU is a chiefly bottle-neck for performance involving many communication scenarios. Second, the synchronization is executed based on a timer timeout and some MAC address entry information is synchronized using chunk handling. This is also a common mechanism especially for the system having software controlled FDB learning processing enabled and many line cards equipped.

The mechanisms as discussed above are not ideal in view of the system resource consumption and performance. With respect to the immediate synchronization, it is very likely to engender CPU overload due to the fact that every MAC address triggers a synchronization action among all the line cards. With respect to the current timer based synchronization, it generally applies a common timer value to synchronize multiple MAC addresses among line cards and thus offers a non-differentiated synchronization mechanism. However, for a time-sensitive service, if the synchronization cannot be completed in a timely manner, it may cause traffic loss and even service disruption. Further, the adjustment of the timer leads to a difficult balance between bandwidth/CPU usage and performance/timeliness requirements for important applications. For instance, If the timer is set too short, it will confront with nearly the same issues as the immediate synchronization. On the other hand, if the timer is set too long, some key services sensitive to the timing would be impacted. Currently, due to constraints of the CPU and bandwidth, it is hard to satisfy some real-time requirements. For example, the VRRP is used to provide gateway resilience for the network and when the VRRP switches over, the port associated with the VRRP MAC address is changed. However, If the change is not reflected or synchronized timely, the traffic would be lost and service would even be disrupted. It can be understood that synchronization of MAC address changes among line cards is crucial in time-sensitive communication and should be solved appropriately.

SUMMARY

To address or mitigate at least one of the above potential problems, certain embodiments of the present invention would provide for an efficient way of managing a MAC address such that the MAC flooding attack can be barred from attacking the Ethernet switch. Further, due to better management of the MAC address, perfect synchronization of MAC address changes among line cards may also be achieved.

According to an embodiment of the present invention, there is provided a method for managing a MAC address. The method comprises assigning a priority to the MAC address. The method also comprises managing the MAC address in a forwarding database based on the priority.

In one embodiment, the method further comprises synchronizing, subsequent to the managing, the MAC address in the forwarding database among multiple line cards based on the assigned priority.

According to another embodiment of the present invention, there is provided an apparatus for managing a MAC address. The apparatus comprises an assigner configured to assign a priority to the MAC address. The apparatus further comprises a manager configured to manage the MAC address in a forwarding database based on the priority.

In one embodiment, the apparatus further comprises a synchronizer configured to synchronize, subsequent to the managing of the manager, the MAC address in the forwarding database among multiple line cards based on the assigned priority.

According to the embodiments of the present invention as presented above, the proposed method and apparatus can be implemented in a distributed architecture. Due to assignment of different priorities to multiple MAC addresses, the important services in relation to the MAC addresses can be guaranteed and will not suffer from the MAC flooding attack. Further, due to easy implementation, the OPEX and complexity of configuration operations associated with the station movement would be significantly decreased, thereby providing high operational efficiency especially for large-span networks. Additionally, the synchronization based on the assigned priority, as discussed above, would shorten service interruption time among multiple line cards and give traffic performance a big boost.

BRIEF DESCRIPTION OF THE DRAWINGS

The embodiments of the present invention that are presented in the sense of examples and their advantages are explained in greater detail below with reference to the accompanying drawings, in which.

DETAILED DESCRIPTION

Embodiments of the invention will be described thoroughly hereinafter with reference to the accompanying drawings. It will be apparent to those skilled in the art that the invention may, however, be embodied in many different forms and should not be construed as limited to the embodiments and specific details set forth herein. Like numbers refer to like elements throughout the specification.

The features, structures, or characteristics of the invention described throughout this specification may be combined in any suitable manner in one or more embodiments. For example, the usage of the phrases "certain embodiments," "some embodiments," or other similar language, throughout this specification refers to the fact that a particular feature, structure, or characteristic described in connection with the embodiment may be included in at least one embodiment of the present invention. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more embodiments.

The embodiments of the present invention will be described in detail below with reference to the corresponding accompanying figures.

Figure 1:
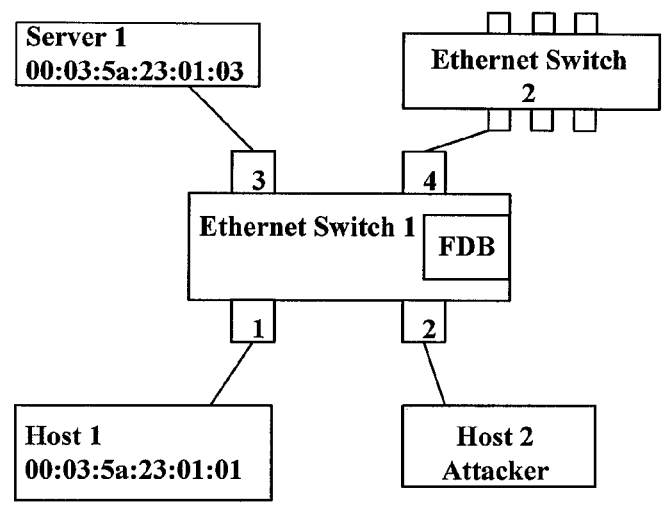
FIG. 1 schematically illustrates an Ethernet architecture in which the MAC flooding attack may arise.
Figure 2:
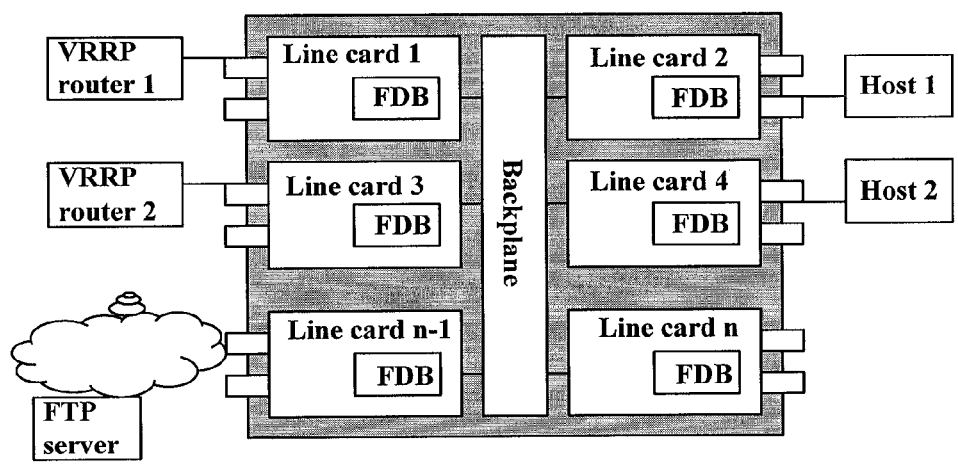
FIG. 2 schematically illustrates a distributed Ethernet switch with multiple line cards.

FIGS. 1 and 2 illustrate an exemplary Ethernet architecture and a distributed Ethernet switch, respectively. Descriptions regarding the Ethernet architecture and the distributed Ethernet switch and their potential problems have been made before and thus additional descriptions are omitted herein for conciseness purposes.

Figure 3:
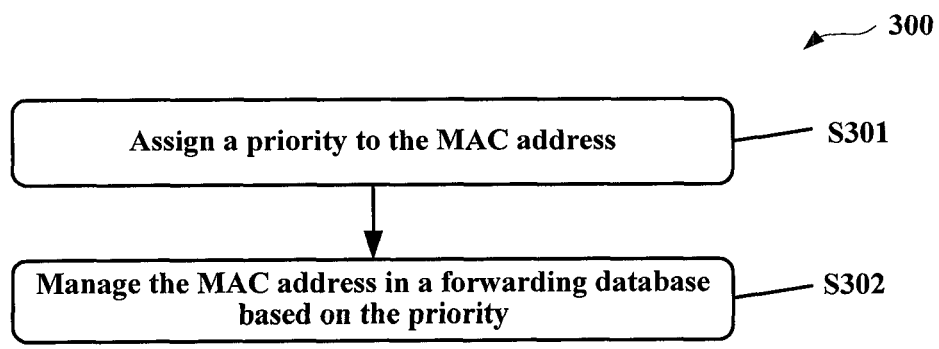
FIG. 3 schematically illustrates a method for managing a MAC address according to an embodiment of the present invention.

FIG. 3 schematically illustrates a method 300 for managing a MAC address according to an embodiment of the present invention. At step S301, the method 300 assigns a priority to the MAC address. According to the embodiments of the present invention and throughout this specification, the MAC address as mentioned previously is one of a plurality of MAC addresses and thus a plurality of priorities can be assigned to the plurality of MAC addresses, respectively and as appropriate. The action of assigning priorities to the MAC addresses can be understood as building a VIP MAC list, in which each MAC address, assigned a priority and thus treated as a VIP MAC address, would precede the dynamic MAC addresses and may be configured to be superior or inferior to some static MAC addresses in the subsequent FDB related activities, such as in the FDB learning process and synchronization among multiple line cards. The exemplary single entry in the VIP MAC list may consist of the following:
- a single MAC address or a range of MAC addresses formed through the subnet mask;
- a port where the source MAC arrives (optional);
- a VLAN ID (optional)
- a priority which uses a numeral value to represent the priority of a VIP MAC address. The bigger the numeral value, the higher the priority. The MAC address with the higher priority would overwrite the MAC address with the lower priority if necessary, as will be discussed later. Suppose the value of the priority ranging from 0 to 255, then the values ranging from 1 to 100 may be assigned to the intended MAC addresses included in the VIP MAC list, the values 0 and 255 may be reserved for special MAC addresses (e.g., certain dynamic and static MAC addresses), and the values ranging from 101 to 254 may be reserved for further usage. It should be noted that the suggested value of the priority is only for an illustrative purpose but not mandatory. A wider or narrower range of values could be chosen and applied according to different practical implementations.

The VIP MAC list can be built in several ways as follows:
1. A Pre-Defined VIP MAC List A VIP MAC list including a predetermined set of MAC addresses can be pre-defined. Upon system booting up, the pre-defined VIP MAC list would be loaded to a system VIP MAC list as a default list. The loaded members or entries to the VIP MAC list can be deleted based on the user's needs. In some embodiments, it is recommended that the VRRP MAC addresses be pre-defined or configured in the system VIP MAC list. The exemplary MAC addresses may be 00-00-5E-00-02-{VRID}, which indicates a set of MAC addresses ranging from 00-00-5e-00-01-00 to 00-00-5e-00-01-ff.

2. Manual Configuration

Users or network administrators, once given access permission, can add to or delete from the VIP MAC list one or more MAC addresses according to network design from a management station. It is suggested that the MAC addresses of some servers, which provide key services, be configured as VIP MAC addresses and included in the VIP MAC list.

3. Automatically Registration

Different from the pre-defined VIP MAC list and the manually configured VIP MAC list which may directly have a VIP MAC address or a set of VIP MAC addresses, some rules could be established to allow some MAC addresses stemming from some specific applications to be VIP MAC addresses. For example, MAC addresses from a specific VLAN (e.g., voice VLAN) could be automatically registered as VIP MAC addresses and assigned corresponding priorities. For instance, the assigned priority for the voice VLAN is 46 which exactly matches the Differentiated Services Code Point (DSCP) of traffic flow of many vendors.

Based on the above discussion, it can be understood that the priority to be assigned may be in dependence on quality of service (QoS) related to the MAC address such that the MAC addresses of some key services requiring high QoS can be assigned higher priorities and thus the service connectivity could be guaranteed.

Following assignment of the priority to the MAC address, the method 300 proceeds to step S302, at which the method 300 manages the MAC address in a FDB based on the priority.

In an embodiment, the managing at step S302 comprises performing a FDB learning process with respect to the MAC address based on the priority, wherein the FDB includes at least one of the following three types of MAC address: the MAC addresses assigned with the priorities (also referred to as "VIP MAC address"), static MAC addresses and dynamic MAC addresses. During the FDB learning process, the VIP MAC address may overwrite a dynamic MAC address (also referred to as "non-VIP MAC address") in the FDB if the FDB is full. In other words, the action of superseding an existing FDB entry for a non-VIP MAC address with an FDB entry for a VIP MAC address is allowed after the FDB has been filled up to its maximum capacity. Further, during the FDB learning process, the MAC address assigned with a higher priority overwrites a MAC address assigned with a lower priority in the FDB if the FDB is full and no non-VIP MAC address is present in the FDB. In other words, the action of superseding an existing FDB entry for a lower priority VIP MAC address with a FDB entry for a higher priority VIP MAC address is allowed after the FDB is full and no existing FDB entry for the non-VIP MAC address. It can be understood that the action of overriding or removing the FDB entry for VIP MAC address is not allowed unless there is no existing FDB entry for the non-VIP MAC address.

Although not shown in FIG. 3, in an embodiment, the method 300 further comprises synchronizing, based on the assigned priority, the MAC address in the FDB among multiple line cards subsequent to the managing of the step S302. In some embodiments, the synchronizing is triggered upon expiration of a time period predetermined based on the assigned priority. In some other embodiments, the synchronizing is triggered when the number of MAC addresses to be synchronized among multiple line cards reaches a value that is predetermined based on the assigned priority. As noted before, the distributed Ethernet switch can benefit from this synchronization processing, and service delay or interruption due to slow synchronization can be eliminated, thereby achieving better communication performance and user experience.

The foregoing has discussed the method 300 and its multiple variants and extensions according to embodiments of the present invention. With the method 300, the MAC addresses can be highly efficiently managed and key services in association with the assigned priorities could be guaranteed and forwarded in a timely manner. Further, the MAC flooding attack can be efficiently resisted based on the assigned priority, thereby significantly increasing the security level of MAC communication.

Figure 4:
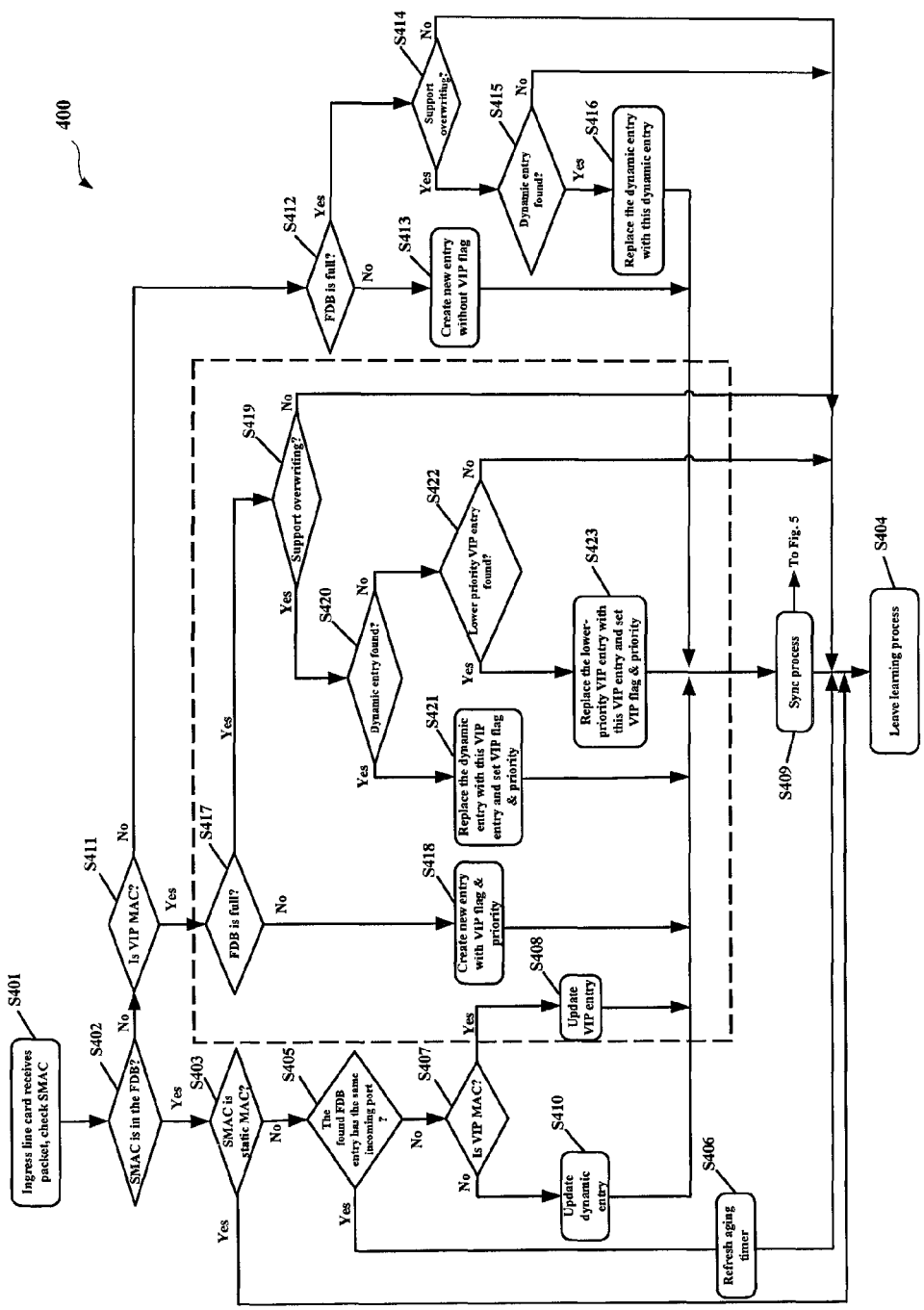
FIG. 4 is a flow chart schematically illustrating a method for managing a MAC address and synchronizing it among multiple line cards according to an embodiment of the present invention.

FIG. 4 is a flow chart schematically illustrating a method for managing a MAC address and synchronizing it among multiple line cards according to an embodiment of the present invention. For an easy understanding, the managing operations according to the embodiments of the present invention are delineated by a dotted box.

As illustrated in FIG. 4, at step S401, the method 400 checks the SMAC address of a packet received by an ingress line card, such as the line card illustrated in FIG. 2. At step S402, the method 400 determines whether the checked SMAC address is found to be in the FDB, i.e., one entry in the FDB already including the checked SMAC address. If this is the case, the method 400 proceeds to step S403, at which the method 400 determines whether the checked SMAC address is a static MAC address. If the checked SMAC address is a static MAC address, then the method 400 proceeds to step S404, at which the method 400 leaves the FDB learning process. If it is determined at step S403 that the checked SMAC address is not a static SMAC address, then at step S405, the method 400 ascertains whether the found FDB entry has the same incoming port as the checked SMAC address. If the answer is Yes, then at step S406, the method 400 refreshes the aging timer with respect to the checked SMAC address and leaves the FDB learning process at step S404, wherein the aging timer is set to determine whether the SMAC address is valid in a predetermined period of time and can be refreshed once a frame including the SMAC address enters into the Ethernet switch. If the answer at step S405 is No, then at step S407, the method 400 determines whether the checked SMAC address is a VIP MAC address, i.e., a MAC address assigned with a priority. If the checked SMAC address is a VIP MAC address, then at step S408, the method 400 updates the VIP entry with the checked SMAC address. Afterwards, the method 400 performs synchronization for this update at step S409, which will be discussed in detail with reference to FIG. 5, and leaves the FDB learning process at step S404. If the answer at step 3407 is No, then at step S410, the method 400 updates the dynamic entry with the checked SMAC address and performs the synchronization at step S409. After that, the method 400 leaves the FDB learning process at step S404.

If the checked SMAC address is not found in the FDB at step S402, to then the method 400 determines whether the checked SMAC address is a VIP MAC address at step S411. If this is not the case, then the method 400 advances to step S412, at which the method 400 checks if the FDB is full. If the FDB is not full, then at step S413, the method 400 creates a new entry without a VIP flag in the FDB. Then, the method 400 advances to step 3409, at which the method 400 performs synchronization and then leaves the FDB learning process at step S404. If the FDB is full, then the method 400 proceeds to step S414, at which the method 400 checks if the FDB supports the overwriting operation. If the answer is Yes, then at step S415, the method 400 determines whether a dynamic MAC entry is found in the FOB. If the dynamic MAC entry is found, then at step S416, the method 400 replaces this dynamic entry with the newly ingoing dynamic entry, i.e., the checked SMAC address at issue. Subsequently, the method 400 proceeds to step S409 for synchronization and leaves the FDB learning process at step S404. If the answers at steps S414 and S415 are No, then the method 400 directly leaves the FDB learning process at step S404.

If the answer at step S411 is Yes, then the method 400 switches to step S417, at which whether the FDB is full is checked. If the FDB is not full, then at step S418, the method 400 creates a new entry with a VIP flag and a priority indicator for the checked SMAC address at issue. After that, the method 400 goes through the steps S409 and S404 and thus completes the FDB learning process. If the FDB is full, i.e., populated with various kinds of MAC addresses, such as VIP MAC addresses, dynamic MAC addresses and static MAC addresses, then at step S419, the method 400 checks if the FDB supports the overwriting operation, similar to the step S414. If the answer is Yes, then at step S420, the method 400 searches the FDB for a dynamic entry including a dynamic MAC address. If the dynamic entry is found at step S420, then at step S421, the method 400 replaces the found dynamic entry with the VIP MAC entry (i.e., the checked SMAC address) and set a corresponding VIP flag and a priority indicator. Then, the method 400 is subject to steps S409 and S404 and the FDB learning process ends.

If the answer at step S420 is No, i.e., no dynamic entry is found in the FDB, then at step S422, the method 400 searches the FDB for a VIP entry whose priority is lower than that of the checked SMAC address. If found, then at step S423, the method 400 replaces the lower VIP entry with a higher VIP entry including the checked SMAC address at issue and sets a corresponding VIP flag and a priority indicator. Then, the method 400 proceeds with steps S409 and S404 and the FDB learning process ends. If the answers at steps S419 and S422 are No, then the method 400 directly leaves the FDB learning process at step S404.

The foregoing has discussed the method 400 according to embodiments of the present invention. With the method 400, the FDB can be efficiently managed by preventing the MAC flooding attack and accelerating the synchronization, thereby notably increasing the communication performance.

Figure 5:
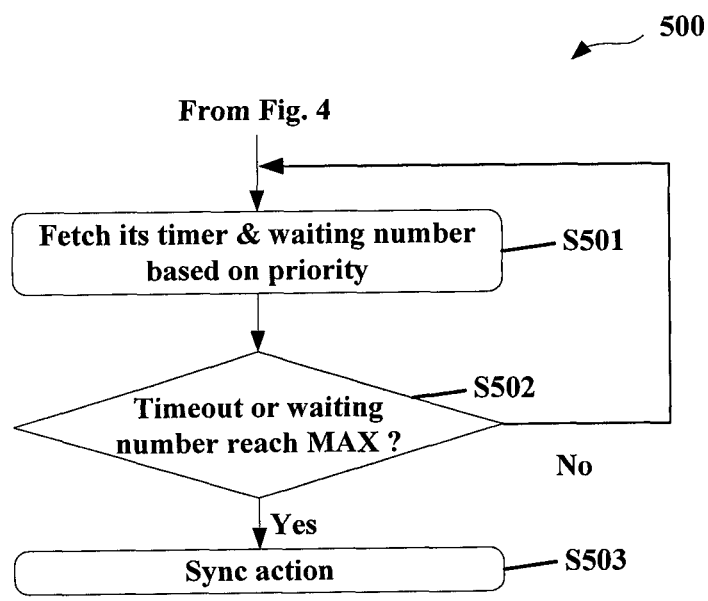
FIG. 5 is a flow chart schematically illustrating a synchronization process among multiple line cards according to another embodiment of the present invention.

FIG. 5 is a flow chart schematically illustrating a synchronization process 500 among multiple line cards according to another embodiment of the present invention. As illustrated in FIG. 5, the synchronization process 500, as illustrated at step S409 in FIG. 4, begins with step S501, at which the line card may fetch, from a VIP MAC list, information about a timer or a waiting number of the updated VIP MAC entry in relation to the synchronization.

Regarding the timer, it can be set to a time period based on the assigned priority such that the synchronizing could be triggered when the timer expires. For example, the network operator could set a timer for FDB synchronization to 3 milliseconds for a VIP MAC address with a priority higher than 80. The synchronization timer could be set to 5 milliseconds for a VIP MAC address with a priority ranging from 60 to 80, and likewise the synchronization timer could be set to 8 milliseconds for a VIP MAC address with a priority ranging from 30 to 60. In this manner, the synchronization of the VIP MAC entry among multiple line cards would be triggered upon expiration of different time periods in dependence on the respective priorities.

Regarding the waiting number, it refers to a maximal number of the MAC addresses to be synchronized among multiple line cards. According to the embodiments of the present invention, the synchronization of each VIP MAC address should be paused until the maximal number is reached. For example, the waiting number of VIP MACs with priorities from 60 to 80 could be set to 10 and the waiting number of VIP MACs with priorities from 30 to 60 could be set to 20. When the number of the MAC addresses to be synchronized reaches the preset maximal number, the synchronization directed to the current updated VIP MAC would be triggered and performed in no time.

The timer and the waiting number as discussed above could be configurable or hard coded. Thereby, VIP MAC addresses with higher priorities will usually have shorter timer periods and less waiting number. When time expires or the specific number of MAC addresses is reached, the synchronization would be executed.

Returning back to the synchronization process 500, upon obtaining the timer or the waiting number preset based on the priority, then at step S502, it is determined whether the timer time out or the waiting number reaches the preset maximal number. If one of the conditions is met, then at step S503, the synchronization action will be performed among multiple line cards. If no condition is met, then the flow will loop back to step S501 and may skip out of the loop until one condition is met. It can be understood that the embodiments of the present invention can provide a differentiated timer-based synchronization mechanism due to the introduction of the distinct priorities. Further, based on this differentiated timer-based synchronization mechanism, different MAC addresses in associated with different services will be synchronized differently dependent on different levels of the assigned priorities.

Figure 6:
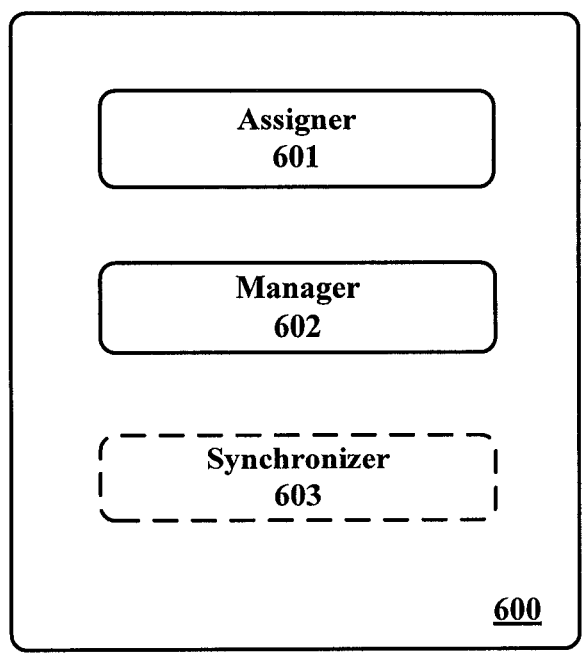
FIG. 6 is a simplified schematic block diagram illustrating an apparatus according to embodiments of the present invention.

FIG. 6 is a simplified schematic block diagram illustrating an apparatus 600 according to embodiments of the present invention. As illustrated in FIG. 6, the apparatus 600 comprises an assigner 601, a manager 602, and a synchronizer 603. The assigner 601 is configured to assign a priority to the MAC address. The manager 602 is configured to manage the MAC address in an FDB based on the priority. The synchronizer 603 is optional and configured to synchronize, subsequent to the managing of the manager 602, the MAC address in the FDB among multiple line cards based on the assigned priority. It can be understood that the apparatus 600 is capable of carrying out the methods 300 and 400 as discussed previously.

It will be appreciated that the invention may be implemented in any suitable form including hardware, software, firmware or any combination of these. The invention may optionally be implemented at least partly as computer software running on one or more data processors and/or digital signal processors. The elements and components of an embodiment of the invention may be physically, functionally and logically implemented in any suitable way. Indeed the functionality may be implemented in a single unit, in a plurality of units or as part of other functional units. As such, the invention may be implemented in a single unit or may be physically and functionally distributed between different units and processors.

In particular, the methods and apparatus according to embodiments of the present invention can be implemented via software control or an Application Specific Integrated Circuit (ASIC)/a Network Process (NP). For implementations in the ASIC or NP, it already has flags to represent the MAC addresses being static or dynamic in the FDB and thus only a simple extension on the current implementation would support the VIP MAC addresses. For example, the flags can be extended from 1 bit to 2 bits to represent three types of MAC addresses, i.e., static, VIP, and dynamic MAC addresses. By this way, only the FDB is searched to determine the behavior in regards to the FDB learning process without causing any performance impact. For software control implementation, it can follow the similar mechanism as above but more capacity can be supported. For example, more bits could be applied to represent the priority.

It is to be noted that, although individual features may be included in different claims, these may possibly be advantageously combined, and the inclusion in different claims does not imply that a combination of features is not feasible and/or advantageous. Also the inclusion of a feature in one category of claims does not imply a limitation to this category but rather indicates that the feature is equally applicable to other claim categories as appropriate. Further, it is to be noted that, the order of features/steps in the claims or in the specification do not imply any specific order in which the features/steps must be worked. Rather, the steps/features may be performed in any suitable order.

The terminology used herein is for the purpose of describing particular embodiments only and is not intended to limit to the invention. As used herein, the singular forms "a," "an" and "the" are intended to comprise the plural forms as well, unless otherwise stated. It will be further understood that the terms "including," "comprising" and conjugation thereof when used herein, specify the presence of stated features, integers, steps, operations, elements, and/or components, but do not preclude the presence or addition of one or more other features, integers, steps, operations, elements, components, and/or groups thereof.

Although the invention has been particularly shown and described with reference to exemplary embodiments thereof, it will be understood by those skilled in the art that various changes in form and details may be made without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims.

What is claimed is:

1. A method for managing a forwarding database used by an Ethernet switch for learning Medium Access Control (MAC) addresses, the method comprising:
    managing three types of entries in the forwarding database, including static entries corresponding to static source MAC addresses, dynamic entries corresponding to dynamic source MAC addresses, and prioritized entries corresponding to prioritized source MAC addresses, wherein the prioritized source MAC addresses are dynamic source MAC addresses that have been assigned a priority;

said managing comprising:
maintaining static entries in the forwarding database according to configuration information that defines the static entries, and disallowing overwriting of the static entries when attempting to learn new source MAC addresses detected in frames incoming to the Ethernet switch; and when attempting to learn a new source MAC address:
adding a new entry to the forwarding database without overwriting any existing entry, responsive to determining that there is room in the forwarding database for the new entry;
adding the new entry to the forwarding database by overwriting an existing dynamic entry, responsive to determining that there is no room for inserting the new entry without overwriting, that the new entry will be a prioritized entry, and that there is at least one dynamic entry in the forwarding database; and
adding the new entry to the forwarding database by overwriting an existing prioritized entry, responsive to determining that there is no room for inserting the new entry without overwriting, that the new entry will be a prioritized entry having a higher priority than the existing prioritized entry, and that there are no dynamic entries in the forwarding database.

2. The method of claim 1, wherein, at least for changes in the forwarding database that involved prioritized entries, said managing further comprises synchronizing the changes across multiple line cards of the Ethernet switch according to a synchronization timing that depends on a priority level or levels associated with the involved prioritized entries.

3. The method of claim 2, wherein synchronizing the changes across the multiple line cards of the Ethernet switch according to a synchronization timing that depends on the priority level or levels associated with the involved prioritized entries comprises using a first synchronization timing for synchronizing changes involving a first range or level of priority, and using a second synchronization timing for synchronizing changes involving a second range or level of priority, wherein the first range or level of priority is higher than the second range or level of priority.

4. The method of claim 1, wherein said managing further comprises synchronizing changes to the forwarding database across multiple line cards of the Ethernet switch according to a differentiated synchronization mechanism that provides a faster synchronization timing for changes involving prioritized entries.

5. The method of claim 1, wherein said managing further comprises synchronizing changes to the forwarding database across multiple line cards of the Ethernet switch based on tracking the number of changes involving prioritized entries in the forwarding database, at least for changes involving prioritized entries above a certain priority level, and triggering a synchronization operation responsive to reaching a threshold number of changes.

6. The method of claim 1, further comprising assigning a priority to a given dynamic source MAC address contained in a frame incoming to the Ethernet switch, for treatment of the given dynamic source MAC address as a given prioritized source MAC address, based on at least one of: an address list identifying source MAC addresses that are to be prioritized, and one or more rules that prioritize certain traffic sources or traffic types.

7. The method of claim 1, wherein, responsive to determining that the source MAC address contained in a given frame received through a switch port of the Ethernet switch corresponds to an existing dynamic entry in the forwarding database, said managing comprises:
when the switch port matches a switch port identified in the existing dynamic entry, refreshing an aging timer running for the existing dynamic entry, wherein an expiration of the aging timer triggers removal of the existing dynamic entry from the forwarding database; and
when the switch port does not match the switch port identified in the existing dynamic entry, updating the existing dynamic entry to match the switch port.

8. The method of claim 1, wherein, responsive to determining that the source MAC address contained in a given frame received through a switch port of the Ethernet switch corresponds to an existing prioritized entry in the forwarding database, said managing comprises, when the switch port does not match the switch port identified in the existing prioritized entry, updating the existing prioritized entry to match the switch port.

9. An apparatus configured to manage a forwarding database used by an Ethernet switch for learning Medium Access Control (MAC) addresses, the apparatus being associated with or comprising a memory containing the forward database and further comprising processing circuitry configured to manage three types of entries in the forwarding database, including static entries corresponding to static source MAC addresses, dynamic entries corresponding to dynamic source MAC addresses, and prioritized entries corresponding to prioritized source MAC addresses, wherein the prioritized source MAC addresses are dynamic source MAC addresses that have been assigned a priority, wherein the processing circuitry is configured to manage the three types of entries based on being configured to:
maintain static entries in the forwarding database according to configuration information that defines the static entries, and disallowing overwriting of the static entries when attempting to learn new source MAC addresses detected in frames incoming to the Ethernet switch; and
when attempting to learn a new source MAC address:
add a new entry to the forwarding database without overwriting any existing entry, responsive to determining that there is room in the forwarding database for the new entry;
add the new entry to the forwarding database by overwriting an existing dynamic entry, responsive to determining that there is no room for inserting the new entry without overwriting, that the new entry will be a prioritized entry, and that there is at least one dynamic entry in the forwarding database; and
add the new entry to the forwarding database by overwriting an existing prioritized entry, responsive to determining that there is no room for inserting the new entry without overwriting, that the new entry will be a prioritized entry having a higher priority than the existing prioritized entry, and that there are no dynamic entries in the forwarding database.

10. The apparatus of claim 9, wherein, at least for changes in the forwarding database that involved prioritized entries, the processing circuitry is configured to synchronize the changes across multiple line cards of the Ethernet switch according to a synchronization timing that depends on a priority level or levels associated with the involved prioritized entries.

11. The apparatus of claim 10, wherein the processing circuitry is configured to synchronize the changes across the multiple line cards of the Ethernet switch according to a synchronization timing that depends on the priority level or levels associated with the involved prioritized entries by using a first synchronization timing for synchronizing changes involving a first range or level of priority, and using a second synchronization timing for synchronizing changes involving a second range or level of priority, wherein the first range or level of priority is higher than the second range or level of priority.

12. The apparatus of claim 9, wherein the processing circuitry is configured to synchronize changes to the forwarding database across multiple line cards of the Ethernet switch according to a differentiated synchronization mechanism that provides a faster synchronization timing for changes involving prioritized entries.

13. The apparatus of claim 9, wherein the processing circuitry is configured to synchronize changes to the forwarding database across multiple line cards of the Ethernet switch based on tracking the number of changes involving prioritized entries in the forwarding database, at least for changes involving prioritized entries above a certain priority level, and triggering a synchronization operation responsive to reaching a threshold number of changes.

14. The apparatus of claim 9, wherein the processing circuitry is configured to assign a priority to a given dynamic source MAC address contained in a frame incoming to the Ethernet switch, for treatment of the given dynamic source MAC address as a given prioritized source MAC address, based on at least one of: an address list identifying source MAC addresses that are to be prioritized, and one or more rules that prioritize certain traffic sources or traffic types.

15. The apparatus of claim 9, wherein, responsive to determining that the source MAC address contained in a given frame received through a switch port of the Ethernet switch corresponds to an existing dynamic entry in the forwarding database, the processing circuitry is configured to:
   when the switch port matches a switch port identified in the existing dynamic entry, refresh an aging timer running for the existing dynamic entry, wherein an expiration of the aging timer triggers removal of the existing dynamic entry from the forwarding database; and
   when the switch port does not match the switch port identified in the existing dynamic entry, update the existing dynamic entry to match the switch port.

16. The apparatus of claim 9, wherein, responsive to determining that the source MAC address contained in a given frame received through a switch port of the Ethernet switch corresponds to an existing prioritized entry in the forwarding database, and responsive to determining that the switch port does not match the switch port identified in the existing prioritized entry, the processing circuitry is configured to update the existing prioritized entry to match the switch port.

* * * * *